(12) United States Patent
Murakami et al.

(10) Patent No.: US 7,092,240 B2
(45) Date of Patent: Aug. 15, 2006

(54) PROCESS FOR PRODUCTION OF ELECTRODE FOR ELECTRIC DOUBLE LAYER CAPACITOR

(75) Inventors: Kenichi Murakami, Wako (JP); Manabu Iwaida, Wako (JP); Shigeki Oyama, Wako (JP); Kouki Ozaki, Inuyama (JP); Masanori Tsutsui, Inuyama (JP)

(73) Assignees: Honda Motor Co., Ltd., Tokyo (JP); Daido Metal Company Ltd., Nagoya (JP)

( * ) Notice: Subject to any disclaimer, the term of this patent is extended or adjusted under 35 U.S.C. 154(b) by 135 days.

(21) Appl. No.: 10/720,692

(22) Filed: Nov. 25, 2003

(65) Prior Publication Data

US 2004/0128813 A1  Jul. 8, 2004

(30) Foreign Application Priority Data

Nov. 29, 2002   (JP) .............................. 2002-348187

(51) Int. Cl.
*H01G 9/00* (2006.01)

(52) U.S. Cl. ..................... 361/502; 29/25.03
(58) Field of Classification Search ............... 29/25.03; 361/271, 502; 257/307, 308, 309; 438/386
See application file for complete search history.

(56) References Cited

U.S. PATENT DOCUMENTS 4,862,328 A * 8/1989 Morimoto et al. .......... 361/502
6,638,385 B1 * 10/2003 Ishikawa et al. ............ 156/182

FOREIGN PATENT DOCUMENTS

| JP | 11-162787   |   | 6/1999  |
|----|-------------|---|---------|
| JP | 11-297579   | * | 10/1999 |
| JP | 2000-323131 | * | 11/2000 |

* cited by examiner

*Primary Examiner*—Carl Whitehead, Jr.
*Assistant Examiner*—Heather Doty
(74) *Attorney, Agent, or Firm*—Arent Fox PLLC

(57) ABSTRACT

A process for producing an electrode for an electric double layer capacitor in which an alcohol based solvent which is a forming aid agent added during preparation of an electrode forming sheet is contained in the electrode forming sheet, and the electrode forming sheet and the collector sheet are joined without removing the solvent. Furthermore, a process for producing an electrode for an electric double layer capacitor in which an alcohol based solvent is added to the electrode forming sheet just before the joining process of the electrode forming sheet and the collector sheet.

13 Claims, 1 Drawing Sheet

PROCESS FOR PRODUCTION OF ELECTRODE FOR ELECTRIC DOUBLE LAYER CAPACITOR

BACKGROUND OF INVENTION

1. Technical Field

The present invention relates to a process for production of electrodes for electric double layer capacitors which are suitable for use for producing an electric double layer capacitor having large capacity and high power.

2. Background Art

An electric double layer capacitor has characteristics such as long service life, high cycle characteristics, and characteristics of charge and discharge with heavy current since there are no chemical reactions during charge and discharge of the capacitor as there are in a conventional secondary battery. Therefore, this capacitor is attracting much attention as a new type of storage battery or as a driving power supply for automobiles and devices. In particular, an electric double layer capacitor having large capacity and high power is being developed.

As a process for producing such an electric double layer capacitor, a method in which conductive adhesive is coated on a collector sheet such as aluminum foil and an electrode forming sheet is joined through this conductive adhesive is known (see Japanese Unexamined Patent Application Publication No. 11-162787). In this method, activated carbon, conductive carbon, binder, and solvent are mixed and kneaded first, and the electrode forming sheet is obtained by rolling and drying. A conductive filler such as carbon black or graphite and a binder comprising a resin component such as polyvinyl alcohol (PVA) are mixed to prepare a conductive adhesive, and then the conductive adhesive is coated on the collector sheet and joined with the electrode forming sheet and is dried.

However, if the electrode forming sheet is completely dried during the producing process of the electrode forming sheet, large amounts of conductive adhesive which is coated to the collector sheet is drawn into gaps of the electrode forming sheet. Therefore, the amount of the conductive adhesive must be increased to maintain joining strength. Furthermore, if the conductive adhesive is absorbed into gaps of the electrode forming sheet, electrostatic capacity may be decreased and the weight may be increased. In particular, when the capacitor is used for automobiles, plural cells are connected in series as the driving power supply, and slight increases in weight or slight decreases in electrostatic capacity of a single cell can cause serious problems in the overall driving power supply. Furthermore, in this case, the capacitor is used under severe conditions, the temperature of the electrolyte may be increased and interface separation may easily occur. Therefore, adhesion strength must be increased.

SUMMARY OF THE INVENTION

The present invention was completed in consideration of the situation described above, and an object of the present invention is to provide a process for production of electrodes for electric double layer capacitor in which sufficient joining strength between the electrode forming sheets and collector sheets can be maintained even with a reduced amount of conductive adhesive.

The process for production of the electrode for electric double layer capacitor of the present invention in which the electrode forming sheet contains activated carbon, conductive carbon, and binder, and the collector sheet having conductive adhesive on its surface are joined has an electrode forming sheet containing an alcohol based solvent of 2 to 10 weight % of the electrode forming sheet during the joining process of the collector sheet and the electrode forming sheet.

In the process for production of the electrode for electric double layer capacitor of the present invention mentioned above, since the gaps between activated carbon and conductive carbon and small pores on the surface of the activated carbon or conductive carbon inside the electrode forming sheet contains an alcohol-based solvent at 2 to 10 weight %, absorption of the conductive adhesive which is coated on the surface of the collector sheet into the pores and the gaps inside the electrode forming sheet can be restrained, and the conductive adhesive can remain around the joining interface.

Therefore, in a process for production of the electrode for electric double layer capacitor of the present invention, since even a small amount of conductive adhesive can remain around the joining interface of the electrode forming sheet and the collector sheet, the joining strength can be maintained sufficiently. Furthermore, since the conductive adhesive is not absorbed into the inside of the electrode forming sheet, increase of the weight and decrease of the electrostatic capacity of the electric double layer capacitor can be restrained as a result.

FIG. 1 is a drawing showing such collector sheet 1 and electrode forming sheet 3 joined by the conductive adhesive 2 in the present invention. Conventionally, the conductive adhesive 2 is easily absorbed into the electrode forming sheet 3. However, the absorption of the conductive adhesive 2 can be restrained in the present invention.

The present invention is further explained below.

It is desirable that the conductive adhesive of the present invention contains conductive filler, binder, and dispersant. Carbon based particles such as carbon black or graphite are desirable as the conductive filler, and it is more desirable that both large and small conductive carbon particles be contained.

In the case in which only particles having large diameters are used, while on the one hand macro conductive paths can be maintained, adhesion and contacting area are small, and separation along the joining interface occurs easily. In the case in which only particles having small diameters are used, while on the one hand adhesion and contacting area are desirable, macro conductive paths are not sufficient. In the conductive adhesive of the present invention, graphite is added as carbon particles of large diameter 22 and carbon black is added as carbon particles of small diameter 21. The ratio of addition is desirably in a range of 30:70 to 70:30, and in the present invention, they are added at a more desirable ratio of 55:44.

Polyvinyl alcohol is added as the binder in the conductive adhesive of the present invention; however, it is not so limited. Other resins such as polyvinyl acetate, polyacrylic acid ester, ethylene-vinyl acetate copolymer, ionomer resin, polyvinyl butyral, nitro cellulose, styrene-butadiene rubber, butadiene-acrylonitrile rubber, neoprene rubber, phenol resin, melamine resin, polyurethane resin, urea resin, polyimide resin, polyamideimide resin, and the like can be used.

As a solvent which is used for the conductive adhesive of the present invention, other then water, various kinds of solvent such as methanol, ethanol, isopropyl alcohol, butanol, trichloroethyrene, dimethylformamide, ethyl ether, and acetone can be used alone or in combination.

In the conductive adhesive of the present invention, carboxymethylcellulose is used as a dispersant. This is added to prevent conductive filler such as carbon black and graphite from being agglutinated.

As a collector sheet of the present invention, various kinds of metallic foils can be used, and aluminum foil is generally desirable. In particular, in the present invention, aluminum foil on which an etching process has been performed on the surface thereof is used. Since carbon particles in the conductive adhesive enter into fine pittings 11 which are formed by this etching process, the conductive adhesive and the collector sheet are strongly joined to restrain interface separation. The collector sheet of the present invention desirably has surface characteristics in which not fewer than 100,000 pittings having a diameter of 4 to 10 µm and a depth of 4 to 15 µm exist per 1 $cm^2$, and the total area of the pittings occupies not more than 50% of the entire surface of the collector sheet.

It is desirable that the amount of alcohol based solvent contained in the electrode forming sheet of the present invention be in a range of 2 to 10 weight %, and more desirably, in a range of 3 to 6 weight %. In the case in which the contained amount is below this range, the absorption of the conductive adhesive into the electrode forming sheet cannot be sufficiently restrained. In the case in which the contained amount is above than this range, appropriate absorption of the conductive adhesive into the electrode forming sheet is disturbed, and as a result, the original joining effect of the conductive adhesive cannot be obtained.

As a step in which the added amount of the alcohol based solvent is controlled, a step in which raw materials are mixed can be considered. In particular, the alcohol based solvent is desirably added just before a joining process of the electrode forming sheet and the collector sheet to improve precision.

In the actual production of the electrode forming sheet of the present invention, the amount of alcohol based solvent contained in the electrode forming sheet is about 12% when the sheet reaches the joining process. Therefore, the amount contained can be controlled in a range of 2 to 10% by drying. For example, in the case in which hot air drying at an air speed of 3 m/s at 30° C. for 3 minutes is performed, the electrode forming sheet having contained therein an amount of 6% can be obtained. In this way, by controlling conditions of hot air drying, an electrode forming sheet containing a desired amount can be obtained.

In the present invention, it is desirable that the alcohol based solvent be a forming aid agent which is added when the activated carbon, the conductive carbon, and the binder are mixed and kneaded. In the case in which the alcohol based solvent added to the electrode forming sheet during the joining process and the forming aid agent are different, both the removing process in which the forming aid agent is removed after forming and the addition process in which the alcohol based solvent is added for 2 to 10 weight % during the joining are required. However, in the case in which the alcohol based solvent and the forming aid agent are the same, only the controlling process of the drying time of the electrode forming sheet is required, and therefore, excessive material and process are no longer necessary, and it is advantageous from the viewpoint of cost.

Furthermore, in the present invention, alcohol based solvent can be added to the electrode forming sheet after rolling process of the electrode forming sheet. In the producing process of the electrode forming sheet, in the case in which the forming aid agent is not added, or even in the case in which the amount of the alcohol based solvent contained is reduced to less than 2 weight % by evaporating in air-drying or the like, the effect of the present invention can be obtained by adding the alcohol based solvent just before the joining process. Similarly, even in the case in which the amount of the alcohol based solvent contained in the electrode forming sheet must be increased, the effect of the present invention can be obtained by adding the alcohol based solvent just before the joining process. In the case in which the alcohol based solvent is added just before the joining process, there is an advantage in that the alcohol based solvent can be added accurately.

EXAMPLES

Figure 1:
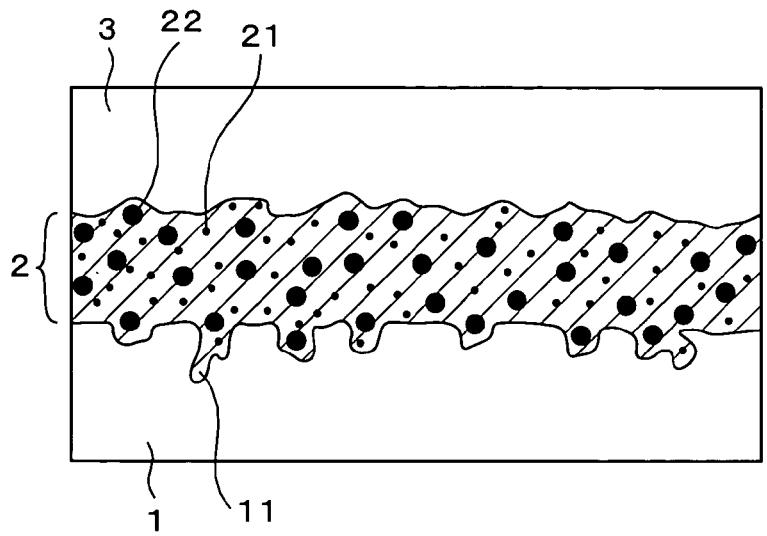
FIG. 1 is a drawing showing a collector sheet and electrode forming sheet joined by a conductive adhesive in the present invention.

The present invention is further explained by way of examples. The present invention is not limited thereto.

1. Preparation of Conductive Adhesive

The following raw materials were mixed and agitated to obtain the conductive adhesive of the present invention.

Polyvinyl alcohol (trade name: Kuraraypoval R-1130, produced by KURARAY CO., LTD.): 3 weight %

Carbon black (trade name: Denkablack, produced by DENKI KAGAKU KOGYO K. K.): 10 weight %

Graphite (trade name: SP-300, produced by NIPPON GRAPHITE INDUSTRIES, LTD.): 10 weight %

Carboxymethylcellulose (dispersant, trade name: Cellogen, produced by DAI-ICHI KOGYO SEIYAKU CO., LTD.): 3 weight %

Purified water: 74 weight %

2. Preparation of Electrode Forming Sheet

The following raw materials were mixed and agitated to disperse the raw material powder uniformly. The mixture was put in a kneading device, and a combining process by double axes was performed for 10 minutes under conditions of 0.5±0.05 MPa, to obtain a solid material. This solid material was pulverized to obtain pulverized powder. This pulverized powder was applied to pre-sheet forming by using calender roller. The thickness of the sheet was controlled by a rolling process using a rolling roll, to obtain the electrode forming sheet of Examples. Activated carbon powder (trade name: KH-1200, produced by KUREHA CHEMICAL INDUSTRIES CO., LTD.): 70 weight %

Conductive carbon (trade name: Denkablack, produced by DENKI KAGAKU KOGYO K. K.): 8.5 weight %

PTFE resin (trade name: Teflon (trade mark) 6J, produced by DU PONT-MITSUI FLUOROCHEMICALS CO., LTD.): 8.5 weight %

Isopropyl alcohol (produced by WAKO PURE CHEMICAL INDUSTRIES, LTD.): 13 weight %

3. Preparation of Electrodes A to I

The electrode forming sheet obtained by the above-mentioned process was put in a drying furnace, an appropriate amount of isopropyl alcohol was evaporated by controlling conditions of hot-air drying, and an electrode forming sheets A to I containing an amount of the alcohol based solvent in a range of 0 to 12 weight % were obtained. The above-mentioned conductive adhesive was coated on one surface of a long etched aluminum foil (trade name: ED-402H, produced by NIPPON CHEMI-CON CORPORATION) by a gravure roller, each of the electrode forming sheet s A to I were joined with the aluminum foil and pressed by a roll press at a pressure of 0.1 MPa. This sheet was dried by vacuum drying at 160° C. for 12 hours to remove isopropyl alcohol which was a forming aid agent, to obtain electrodes A to I.

4. Evaluation of Adhesive Strength

A tension testing device (AIKO ENGINEERING MODEL-1310) was attached on collector sheet side and electrode forming sheet side of the above-mentioned electrodes A to I by double-faced tape, and the device was pulled along opposite directions at 5 mm/min. Adhesive strength until separation occured between the collector sheet and the electrode forming sheet was measured. The results are shown in Table 1. It should be noted that separation was observed along the joining interface in the case of electrodes A to D, H, and I by pulling in the tensile strength shown in Table 1, although the electrode forming sheet was broken before separation of interface occurred in the case of electrodes E to G.

TABLE 1

| | Contained amount of alcohol based solvent (weight %) | Adhesive strength (g/cm$^2$) |
|---|---|---|
| Electrode A | 0 | 100 |
| Electrode B | 0.5 | 260 |
| Electrode C | 1.0 | 350 |
| Electrode D | 1.5 | 460 |
| Electrode E | 2.0 | 530 |
| Electrode F | 3.0 | 540 |
| Electrode G | 10.0 | 530 |
| Electrode H | 11.0 | 510 |
| Electrode I | 12.0 | 500 |

Figure 2:
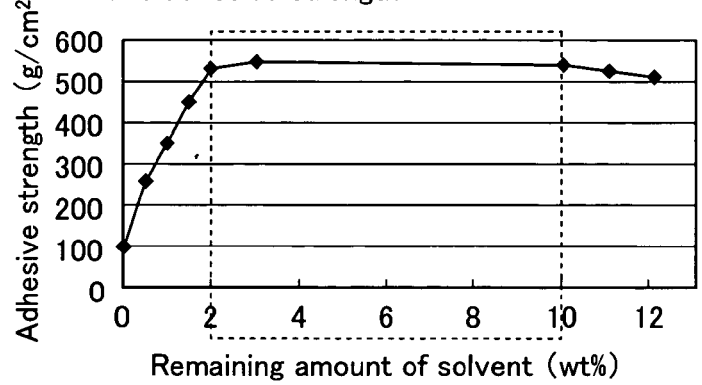
FIG. 2 is a graph showing the relationship of the amount of the alcohol based solvent contained in the electrode forming sheet and the adhesive strength.

The relationship of the the amount of the alcohol based solvent contained in the electrode forming sheet and the adhesive strength is shown in FIG. 2. In the case in which the amount contained was in a range from 0 to 2%, the contained amount and the adhesive strength show nearly a proportional relationship, and in the case of more than 10%, sufficient adhesive strength cannot be obtained since the alcohol based solvent disturbs absorption of the conductive adhesive.

Figure 3:
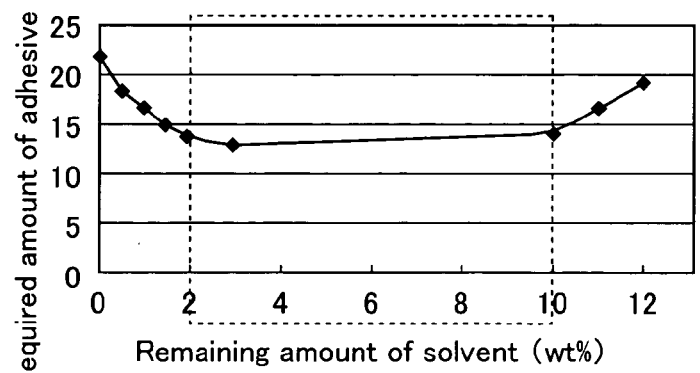
FIG. 3 is a graph showing the relationship of the amount of the alcohol based solvent contained in the electrode forming sheet and the required amount of the adhesive.

The relationship of the contained amount of the alcohol based solvent and required amount of the conductive adhesive is shown in FIG. 3. In the case in which the contained amount of the alcohol based solvent is 0%, the required amount of the conductive adhesive exhibited the maximum value since the conductive adhesive was absorbed into the electrode forming sheet. The required amount the conductive adhesive was decreased as the amount of the alcohol based solvent contained was increased. A constant value was observed in a range of 2 to 10%, and a more desirable minimum value was observed in a range of 3 to 6%.

As explained above, in the process for production of the electrode for electric double layer capacitor of the present invention, joining strength of the electrode forming sheet and the collector sheet can be maintained even in the case in which the amount of conductive adhesive used is small.

What is claimed is:

1. A process for producing an electrode for an electric double layer capacitor, the process comprising:
   joining an electrode forming sheet including activated carbon, conductive carbon, and binder and a collector sheet having a conductive adhesive on its surface; and
   containing alcohol based solvent having 2 to 10% by weight of the electrode forming sheet in the electrode forming sheet while joining the collector sheet and the electrode forming sheet.

2. The process for producing an electrode for an electric double layer capacitor according to claim 1, wherein the alcohol based solvent is a forming aid agent which is used during a kneading process of the activated carbon, the conductive carbon, and the binder.

3. The process for producing an electrode for an electric double layer capacitor according to claim 1, wherein the conductive adhesive contains carbon particles of large diameter and small diameter at a ratio in a range of 30:70 to 70:30 as a conductive filler.

4. The process for producing an electrode for an electric double layer capacitor according to claim 1, wherein the collector sheet has not fewer than 100,000 pittings having a diameter of 4 to 10 μm and a depth of 4 to 15 μm exists per 1 cm$^2$, and the total area of the pittings occupies not more than 50% of the entire surface of the collector sheet.

5. The process for producing an electrode for an electric double layer capacitor according to claim 1, wherein the electrode forming sheet contains alcohol based solvent having 3 to 6% by weight of the electrode forming sheet in the electrode.

6. A process for producing an electrode for an electric double layer capacitor, the process comprising:
   joining an electrode forming sheet including activated carbon, conductive carbon, and binder and a collector sheet having a conductive adhesive on its surface; and
   containing alcohol based solvent having 2 to 10% by weight of the electrode forming sheet in the electrode forming sheet while joining the collector sheet and the electrode forming sheet, wherein the alcohol based solvent is added in the electrode forming sheet after rolling process of the electrode forming sheet.

7. The process for producing an electrode for an electric double layer capacitor according to claim 6, wherein the conductive adhesive contains carbon particles of large diameter and small diameter at a ratio in a range of 30:70 to 70:30 as a conductive filler.

8. The process for producing an electrode for an electric double layer capacitor according to claim 6, wherein the collector sheet has not fewer than 100,000 pittings having a diameter of 4 to 10 μm and a depth of 4 to 15 μm exists per 1 cm$^2$, and the total area of the pittings occupies not more than 50% of the entire surface of the collector sheet.

9. The process for producing an electrode for an electric double layer capacitor according to claim 6, wherein the electrode forming sheet contains alcohol based solvent having 3 to 6% by weight of the electrode forming sheet in the electrode.

10. A process for producing an electrode for an electric double layer capacitor, the process comprising:
   joining an electrode forming sheet including activated carbon, conductive carbon, and binder and a collector sheet having a conductive adhesive on its surface; and
   containing alcohol based solvent having 2 to 10% by weight of the electrode forming sheet in the electrode forming sheet while joining the collector sheet and the electrode forming sheet, wherein the alcohol based solvent is a forming aid agent which is used during a kneading process of the activated carbon, the conductive carbon, and the binder, and wherein additional alcohol based solvent is added in the electrode forming sheet after rolling process of the electrode forming sheet.

11. The process for producing an electrode for an electric double layer capacitor according to claim 10, wherein the conductive adhesive contains carbon particles of large diameter and small diameter at a ratio in a range of 30:70 to 70:30 as a conductive filler.

12. The process for producing an electrode for an electric double layer capacitor according to claim 10, wherein the collector sheet has not fewer than 100,000 pittings having a diameter of 4 to 10 μm and a depth of 4 to 15 μm exists per 1 $cm^2$, and the total area of the pittings occupies not more than 50% of the entire surface of the collector sheet.

13. The process for producing an electrode for an electric double layer capacitor according to claim 10, wherein the electrode forming sheet contains alcohol based solvent having 3 to 6% by weight of the electrode forming sheet in the electrode.

* * * * *